(12) United States Patent
Terada et al.

(10) Patent No.: US 10,558,010 B2
(45) Date of Patent: Feb. 11, 2020

(54) SOLID IMMERSION LENS HOLDER AND IMAGE ACQUISITION DEVICE

(71) Applicant: HAMAMATSU PHOTONICS K.K., Hamamatsu-shi, Shizuoka (JP)

(72) Inventors: Hirotoshi Terada, Hamamatsu (JP); Ikuo Arata, Hamamatsu (JP); Masataka Ikesu, Hamamatsu (JP)

(73) Assignee: HAMAMATSU PHOTONICS K.K., Hamamatsu-Shi, Shizuoka (JP)

( * ) Notice: Subject to any disclaimer, the term of this patent is extended or adjusted under 35 U.S.C. 154(b) by 88 days.

(21) Appl. No.: 15/504,395

(22) PCT Filed: Sep. 24, 2015

(86) PCT No.: PCT/JP2015/076880
§ 371 (c)(1),
(2) Date: Feb. 16, 2017

(87) PCT Pub. No.: WO2016/047666
PCT Pub. Date: Mar. 31, 2016

(65) Prior Publication Data
US 2017/0235087 A1    Aug. 17, 2017

(30) Foreign Application Priority Data

Sep. 26, 2014    (JP) .................................. 2014-197008

(51) Int. Cl.
*G02B 7/02*    (2006.01)
*G02B 7/16*    (2006.01)
(Continued)

(52) U.S. Cl.
CPC .............. *G02B 7/027* (2013.01); *G02B 7/02* (2013.01); *G02B 7/16* (2013.01); *G02B 21/0052* (2013.01);
(Continued)

(58) Field of Classification Search
CPC .... G02B 21/33; G02B 21/027; G02B 21/362; G02B 21/361; G02B 7/027; G02B 7/037;
(Continued)

(56) References Cited

U.S. PATENT DOCUMENTS

| | | | | |
|---|---|---|---|---|
| 4,281,895 A | * | 8/1981 | Mohr | ...................... G02B 7/007 359/827 |
| 5,125,750 A | * | 6/1992 | Corle | ...................... G01Q 80/00 359/356 |

(Continued)

FOREIGN PATENT DOCUMENTS

| | | |
|---|---|---|
| CN | 1770285 | 5/2006 |
| CN | 1875306 A | 12/2006 |

(Continued)

OTHER PUBLICATIONS

English-language translation of International Preliminary Report on Patentability (IPRP) dated Apr. 6, 2017 that issued in WO Patent Application No. PCT/JP2015/076880.

(Continued)

*Primary Examiner* — David E Harvey
(74) *Attorney, Agent, or Firm* — Drinker Biddle & Reath LLP

(57) ABSTRACT

A solid immersion lens holder includes a first member having a first opening disposing a spherical face portion therein so that a part of the spherical face portion protrudes toward an objective lens side and a second member having a second opening disposing a contact portion therein so that a contact face protrudes toward a side opposite to the objective lens side. The first member includes three protrusion portions extending from an inner face of the first opening toward a center of the first opening and configured to be contactable with the spherical face portion.

6 Claims, 6 Drawing Sheets

(51) Int. Cl.
*G02B 21/00* (2006.01)
*G02B 21/02* (2006.01)
*G02B 21/26* (2006.01)
*G02B 21/33* (2006.01)
*G02B 21/36* (2006.01)

(52) U.S. Cl.
CPC ............ *G02B 21/02* (2013.01); *G02B 21/26* (2013.01); *G02B 21/33* (2013.01); *G02B 21/361* (2013.01); *G02B 21/362* (2013.01)

(58) Field of Classification Search
CPC . G02B 7/02; G02B 7/16; G02B 7/052; G02B 21/052; G02B 21/26; G01N 21/9501
See application file for complete search history.

(56) References Cited

U.S. PATENT DOCUMENTS

| | | | | |
|---|---|---|---|---|
| 6,256,287 | B1* | 7/2001 | Baartman | B82Y 10/00 720/686 |
| 6,396,789 | B1* | 5/2002 | Guerra | B82Y 10/00 369/112.01 |
| 6,594,086 | B1* | 7/2003 | Pakdaman | G02B 3/00 359/368 |
| 6,828,811 | B2* | 12/2004 | Hanson | G02B 21/24 356/237.5 |
| 8,094,389 | B2* | 1/2012 | Terada | G01N 21/9501 324/756.03 |
| 9,358,736 | B2* | 6/2016 | Wang | B29D 11/00567 |
| 2003/0142418 | A1* | 7/2003 | Hirunuma | G02B 7/026 359/819 |
| 2005/0094293 | A1* | 5/2005 | Tanabe | G02B 7/14 359/811 |
| 2006/0077788 | A1 | 4/2006 | Shinoda | |
| 2006/0182001 | A1* | 8/2006 | Isobe | G02B 7/02 369/112.24 |
| 2007/0014210 | A1 | 1/2007 | Nishioka | |
| 2010/0110571 | A1* | 5/2010 | Ono | G02B 7/021 359/824 |
| 2010/0246033 | A1* | 9/2010 | Hattori | G02B 7/021 359/819 |
| 2012/0063014 | A1* | 3/2012 | Terahara | G02B 7/08 359/813 |
| 2012/0092655 | A1* | 4/2012 | Dozor | G02B 21/33 356/237.2 |
| 2012/0113534 | A1 | 5/2012 | Arata et al. | |
| 2015/0260976 | A1* | 9/2015 | Frank | G02B 21/33 359/656 |
| 2015/0273898 | A1* | 10/2015 | Kataoka | G02B 7/022 347/16 |
| 2015/0316741 | A1* | 11/2015 | Kim | G01Q 60/22 359/825 |
| 2018/0095261 | A1* | 4/2018 | Bae | G02B 7/004 |

FOREIGN PATENT DOCUMENTS

| | | | |
|---|---|---|---|
| CN | 1875307 A | 12/2006 | |
| CN | 100380153 | 4/2008 | |
| CN | 101329438 | 12/2008 | |
| CN | 101688963 | 3/2010 | |
| CN | 101713854 | 5/2010 | |
| DE | 3025685 A1 * | 6/1981 | ............ G02B 21/02 |
| JP | 58-187907 * | 11/1983 | |
| JP | 2006-201407 A | 8/2006 | |
| JP | 2007248872 A * | 9/2007 | |
| JP | 2010-085715 A | 4/2010 | |
| JP | 4495086 B2 | 6/2010 | |
| JP | 2011-164007 A | 8/2011 | |
| JP | 2013-105115 A | 5/2013 | |
| WO | WO-2006/077834 A1 | 7/2006 | |
| WO | WO 2008/156037 A1 | 12/2008 | |
| WO | WO 2010/140552 A1 | 12/2010 | |

OTHER PUBLICATIONS

English-language translation of International Preliminary Report on Patentability (IPRP) dated Apr. 6, 2017 that issued in WO Patent Application No. PCT/JP2015/076881.

* cited by examiner (a)

(b)

(a)

(b)

SOLID IMMERSION LENS HOLDER AND IMAGE ACQUISITION DEVICE

TECHNICAL FIELD

An aspect of the present invention relates to a solid immersion lens holder and an image acquisition device including the solid immersion lens holder.

BACKGROUND ART

As a lens for obtaining an enlarged image of an observation object, a solid immersion lens (SIL) is known. The solid immersion lens is, for example, a microscopic lens which is formed in a semispherical shape or a super-semispherical shape called a Weierstrass sphere and has a size of about 1 mm to 5 mm. When the solid immersion lens is installed to contact a surface of an observation object, both a numerical aperture (NA) and a magnification are enlarged and thus an observation can be performed with high spatial resolution.

As a solid immersion lens holder that holds such a solid immersion lens at a front side (an observation object side) of an objective lens, for example, a solid immersion lens holder disclosed in Patent Literature 1 is known. The solid immersion lens holder disclosed in Patent Literature 1 has an accommodation space which is larger than a spherical face portion of the solid immersion lens and holds the solid immersion lens in a swingable manner. Accordingly, in a case where a bottom face (a contact face) of the solid immersion lens contacts the observation object, the solid immersion lens swings inside the solid immersion lens holder so that the contact face follows the observation object so as to closely contact it. As a result, the solid immersion lens and the observation object can satisfactorily closely contact each other.

CITATION LIST

Patent Literature

Patent Literature 1: Japanese Unexamined Patent Publication No. 2006-201407

SUMMARY OF INVENTION

Technical Problem

In the solid immersion lens holder of Patent Literature 1, a contact portion of the solid immersion lens with respect to the spherical face portion is formed as a lens receiving face which has the same curvature as that of the spherical face portion. In this configuration, because the spherical face portion and the lens receiving face come into surface-contact with each other, a contact area is large. For this reason, a swing between the solid immersion lens and the solid immersion lens holder is suppressed by a frictional force acting on the solid immersion lens in a close contact state. As a result, there is a concern that the contact face of the solid immersion lens cannot easily follow the surface of the observation object.

An object of an aspect of the present invention is to provide a solid immersion lens holder enabling a solid immersion lens to easily follow and closely contact an observation object and an image acquisition device including the solid immersion lens holder.

Solution to Problem

According to an aspect of the present invention, there is provided a solid immersion lens holder holding a solid immersion lens at a front side of an objective lens, wherein the solid immersion lens having a spherical face portion disposed to face the objective lens and a contact portion including a contact face for contacting an observation object, wherein the solid immersion lens holder includes: a first member having a first opening disposing the spherical face portion therein so that a part of the spherical face portion protrudes toward an objective lens side; and a second member having a second opening disposing the contact portion therein so that the contact face protrudes toward a side opposite to the objective lens side, wherein the first member includes three protrusion portions extending from an inner face of the first opening toward a center of the first opening and configured to be contactable with the spherical face portion.

According to the solid immersion lens holder, because three protrusion portions contact the spherical face portion of the solid immersion lens, a contact area with respect to the solid immersion lens can be decreased. Accordingly, because a frictional force acting on the solid immersion lens when the solid immersion lens swings decreases, the solid immersion lens and the solid immersion lens holder can easily slide on each other. As a result, the solid immersion lens can easily follow and closely contact the observation object.

In the solid immersion lens holder according to an aspect of the present invention, the three protrusion portions may be provided at an interval of 120 degrees in a circumferential direction of the first opening. In this case, in a case where the protrusion portion contacts the spherical face portion, an average force can be applied to the spherical face portion of the solid immersion lens. Accordingly, the solid immersion lens can easily follow and closely contact the observation object.

In the solid immersion lens holder according to an aspect of the present invention, a line passing through a contact position between each of the three protrusion portions and the spherical face portion and a curvature center of the spherical face portion may intersect an optical axis of the objective lens in the range of 30 to 65 degrees. In this case, it is possible to ensure a satisfactory slide between the solid immersion lens and the solid immersion lens holder while keeping a viewing field of the objective lens.

In the solid immersion lens holder according to an aspect of the present invention, the three protrusion portions may be configured to come into line-contact with the spherical face portion. In this case, it is possible to further decrease a contact area of the protrusion portion with respect to the solid immersion lens and thus to further easily slide the solid immersion lens and the solid immersion lens holder on each other. Accordingly, the solid immersion lens can further easily follow and closely contact the observation object.

In the solid immersion lens holder according to an aspect of the present invention, a contact position between each of the three protrusion portions and the spherical face portion may be located on a circumference having a center of the first opening as a center. In this case, in a case where the protrusion portion contacts the spherical face portion, an average force can be applied to the spherical face portion of the solid immersion lens. Accordingly, the solid immersion lens can easily follow and closely contact the observation object.

According to an aspect of the present invention, there is provided an image acquisition device including: a stage holding an observation object; an objective lens disposed to face the observation object on the stage; the above-described solid immersion lens holder holding the solid immersion lens at the front side of the objective lens; an optical detector for detecting light from the observation object through the solid immersion lens and the objective lens and for outputting image data; and an image generating device for generating an image of the observation object based on the image data.

According to the image acquisition device, because the solid immersion lens holder contacts the spherical face portion of the solid immersion lens through three protrusion portions, a contact area with respect to the solid immersion lens can be decreased. Accordingly, because a frictional force acting on the solid immersion lens decreases in a case where the solid immersion lens swings, the solid immersion lens and the solid immersion lens holder can easily slide on each other. As a result, the solid immersion lens can easily follow and closely contact the observation object. For that reason, a sharp image of the observation object can be acquired.

Advantageous Effects of Invention

According to an aspect of the present invention, it is possible to provide a solid immersion lens holder enabling a solid immersion lens to easily follow and closely contact an observation object and an image acquisition device including the solid immersion lens holder.

DESCRIPTION OF EMBODIMENTS

Figure 1:
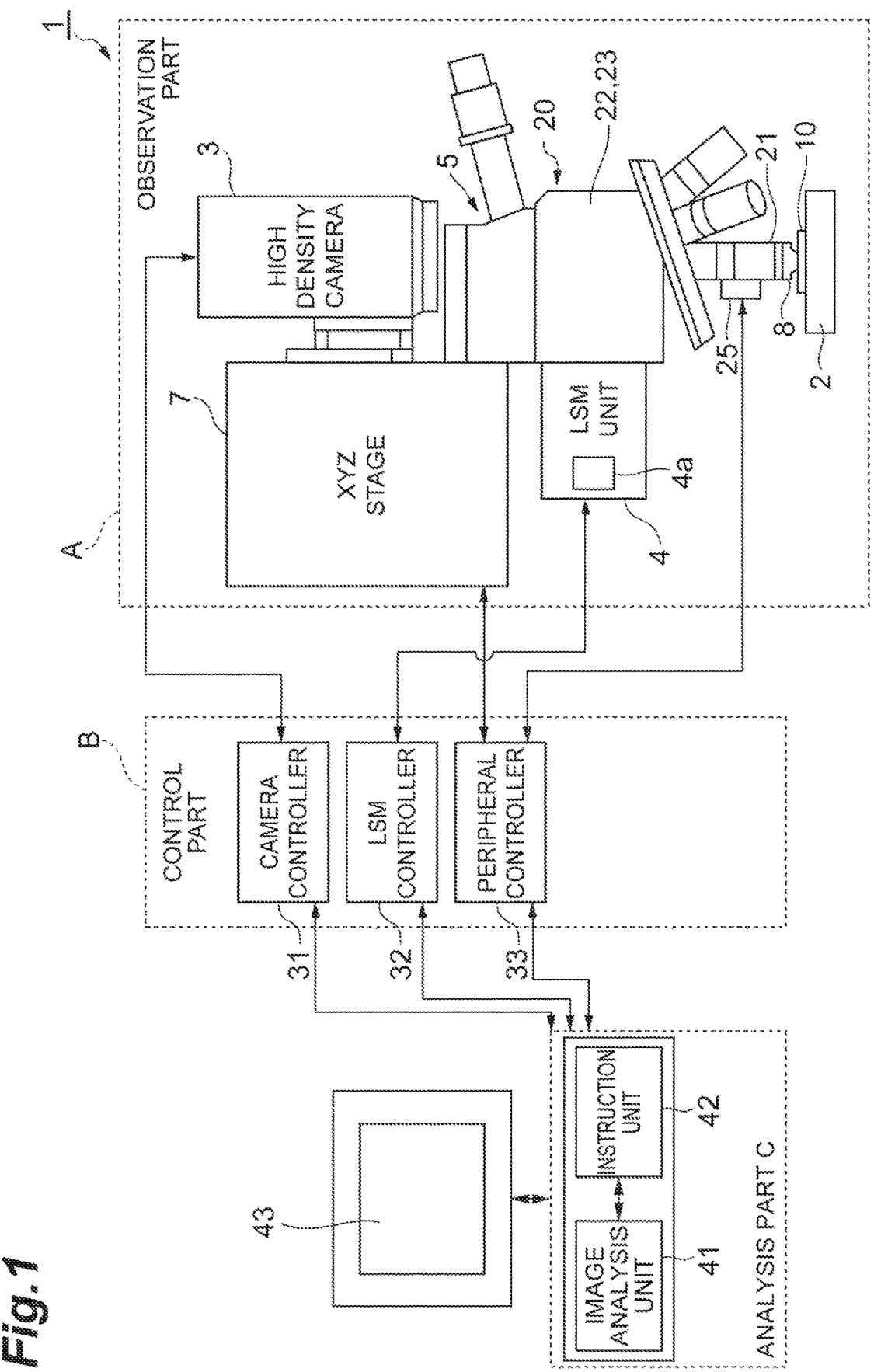
FIG. 1 is a configuration diagram illustrating a semiconductor inspection device including a solid immersion lens holder according to an embodiment.

Hereinafter, preferred embodiments of a solid immersion lens holder according to the present invention will be described with reference to the drawings. Further, in the drawings, the same reference numerals will be given to the same or corresponding components and a repetitive description thereof will be omitted.

Figure 2:
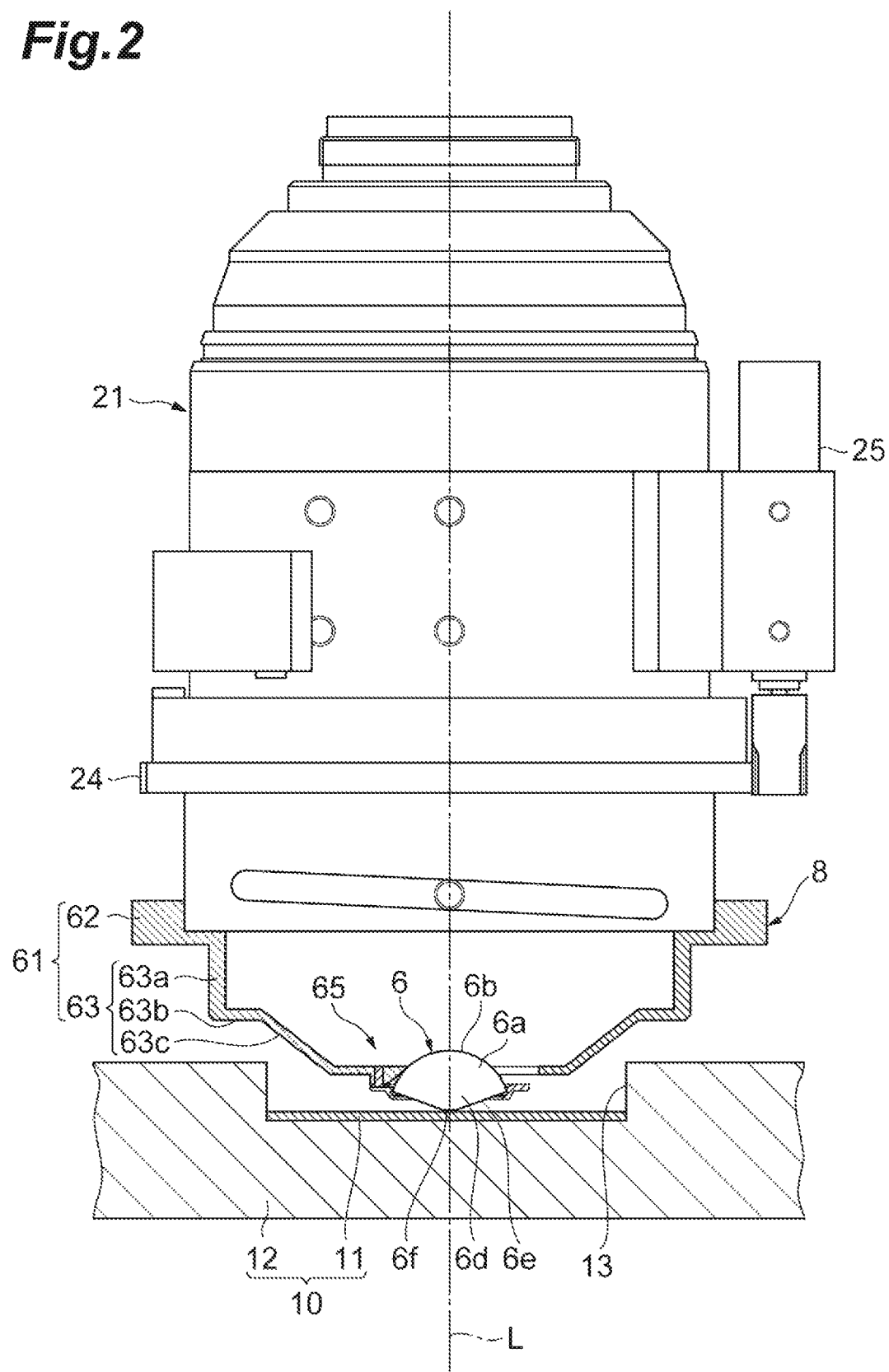
FIG. 2 is a configuration diagram illustrating an objective lens and the solid immersion lens holder.
Figure 3:
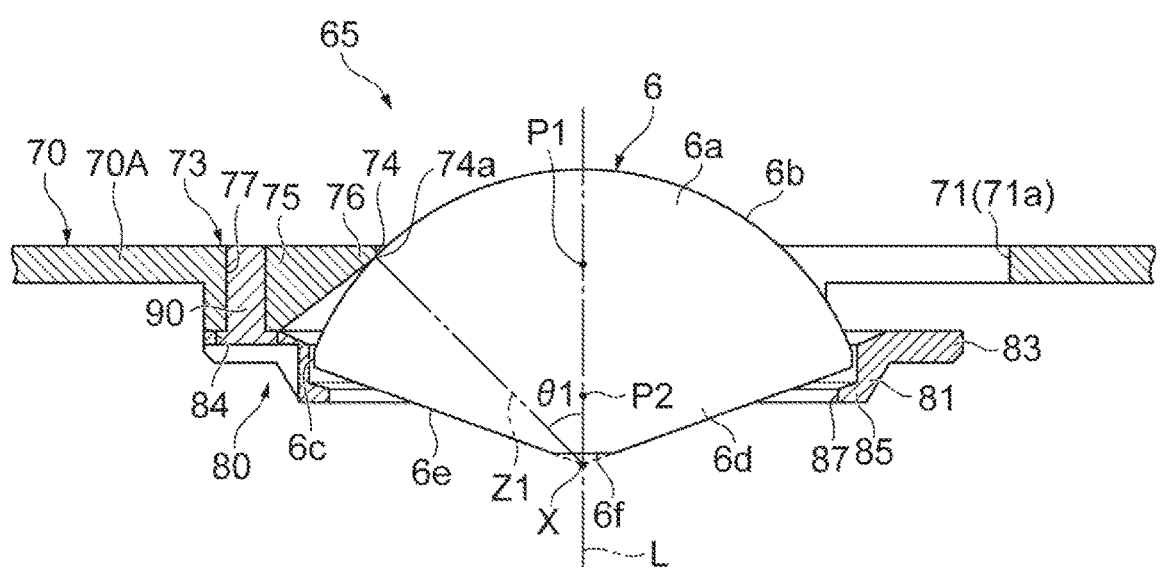
FIG. 3 is an enlarged view of a main part of FIG. 2.
Figure 4:
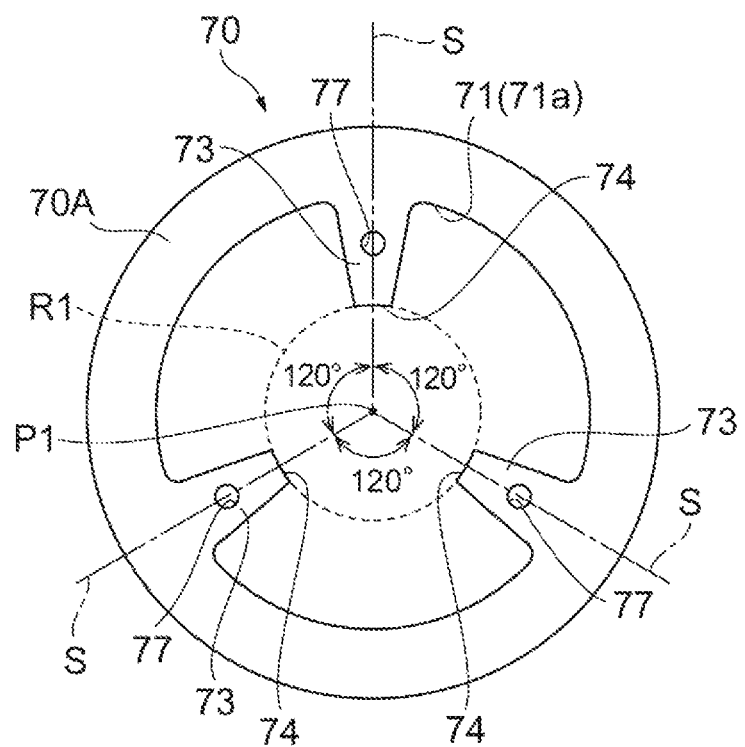
FIG. 4 is a diagram illustrating a first member of FIG. 3 when viewed from the objective lens.
Figure 5:
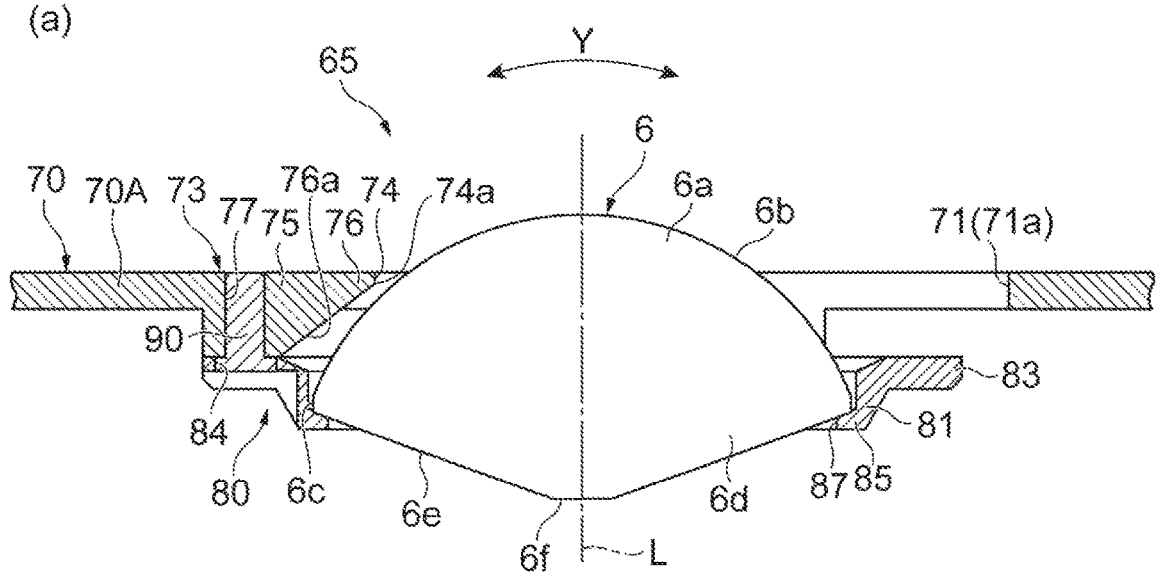
FIG. 5(*a*) is a diagram illustrating a state before the solid immersion lens contacts the observation object and FIG. 5(*b*) is a diagram illustrating a state where the solid immersion lens contacts the observation object.
Figure 5:
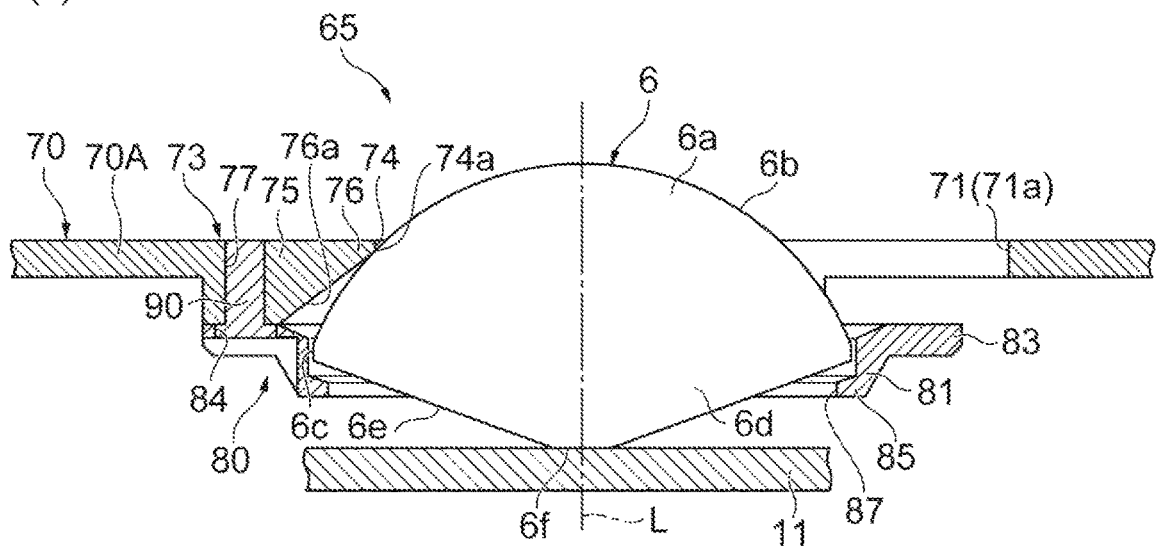

FIG. 1 is a configuration diagram illustrating a semiconductor inspection device (an image acquisition device) including a solid immersion lens holder according to an embodiment. FIG. 2 is a configuration diagram illustrating an objective lens and the solid immersion lens holder. FIG. 3 is an enlarged view of a main part of FIG. 2. FIG. 4 is a diagram illustrating a solid immersion lens holding portion of FIG. 3 when viewed from the objective lens. FIG. 5(*a*) is a diagram illustrating a state before the solid immersion lens contacts the observation object and FIG. 5(*b*) is a diagram illustrating a state where the solid immersion lens contacts the observation object. Further, FIGS. 1 to 3 illustrate a sample observation state where the solid immersion lens contacts the observation object. In the description below, a description will be made on the assumption that a direction toward the objective lens side with respect to the solid immersion lens is an up direction and a direction toward the observation object side is a down direction.

As illustrated in FIGS. 1 and 2, a semiconductor inspection device (an image acquisition device) 1 is, for example, an inspection device which acquires an image of a semiconductor device 11 and inspects the internal information thereof by setting the semiconductor device 11 (see FIG. 2) that belongs to a mold type semiconductor device and serves as a sample 10 as an observation object.

The "mold type semiconductor device" is a device in which the semiconductor device 11 is molded by resin 12. Further, the "internal information" includes a circuit pattern of the semiconductor device or faint light from the semiconductor device. As the faint light, light which is emitted from an abnormal position based on a defect of the semiconductor device or transient light which is emitted by a switching operation of a transistor in the semiconductor device is exemplified. Further, the "internal information" also includes heat based on a defect of the semiconductor device.

In the sample 10, the resin 12 is cut so that a rear face of the semiconductor device 11 buried inside the resin 12 is exposed. The sample 10 is held by a stage 2 while the semiconductor device 11 is placed on the stage 2 installed at an observation part A so that a rear face of the semiconductor device is directed upward. In this way, because a part of the sample 10 is cut so that the rear face of the semiconductor device 11 is exposed, the semiconductor device 11 is located at a bottom face of a concave portion 13 in which the resin 12 is cut. Then, in the embodiment, the semiconductor inspection device 1 inspects a lower face (in the drawing) of the semiconductor device 11 (an integrated circuit or the like formed on a substrate surface of the semiconductor device 11).

The semiconductor inspection device 1 includes the observation part A which observes the semiconductor device 11, a control part B which controls the operations of components of the observation part A, and an analysis part C which performs processes and instructions necessary for the inspection of the semiconductor device 11.

The observation part A includes a high-sensitive camera 3 and a laser scanning microscope (LSM) unit 4 which serve as an image acquisition unit for acquiring an image from the semiconductor device 11, an optical system 20 which includes an objective lens 21 of a microscope 5, a solid immersion lens 6 (see FIG. 2) which obtains an enlarged observation image of the semiconductor device 11, and an X-Y-Z stage 7 which moves these components in the orthogonal X-Y-Z directions. The objective lens 21 is disposed between the semiconductor device 11 and the high-sensitive camera 3 and the LSM unit 4 and is disposed to face the semiconductor device 11.

The optical system 20 includes a camera optical system 22 and an LSM unit optical system 23 in addition to the objective lens 21. As the objective lens 21, a plurality of objective lenses having different magnifications are provided to be switched. Further, the objective lens 21 includes a correction collar 24 (see FIG. 2) and can be reliably focused to a position which needs to be observed in accordance with the adjustment of the correction collar 24. The camera optical system 22 guides a light which has passed through the solid immersion lens 6 and the objective lens 21 from the semiconductor device 11 toward the high-sensitive camera 3 (the optical detector). The high-sensitive camera 3 outputs image data for generating an image of a circuit pattern of the semiconductor device 11. A CCD area image sensor or a CMOS area image sensor is mounted on the high-sensitive camera 3. Further, the high-sensitive camera 3 may be configured as an InGaAs camera, an InSb camera, a MCT camera, or the like.

Meanwhile, the LSM unit optical system 23 reflects an infrared laser light emitted from the LSM unit 4 toward the objective lens 21 side by a light splitter (not illustrated) so that the infrared laser light is guided to the semiconductor device 11. The LSM unit optical system 23 guides the reflection laser light, emitted from the semiconductor device 11 and advancing toward the high-sensitive camera 3 through the solid immersion lens 6 and the objective lens 21, toward the LSM unit 4.

The LSM unit 4 emits an infrared laser light toward the semiconductor device 11 side while scanning the semiconductor device in the X-Y directions and detects a reflection light from the semiconductor device 11 by an optical detector 4a such as an avalanche photodiode, a photodiode, a photomultiplier tube, and a superconducting single photon detector. The intensity of the detected light is the intensity reflecting the circuit pattern of the semiconductor device 11. Thus, the optical detector 4a of the LSM unit 4 scans the semiconductor device 11 by the infrared laser light in the X-Y directions through the LSM unit 4 and outputs image data for generating an image of the circuit pattern of the semiconductor device 11.

The X-Y-Z stage 7 is a movable stage which moves the high-sensitive camera 3, the LSM unit 4, the optical system 20, and the solid immersion lens 6 in the X-Y directions (a horizontal direction; a direction which is parallel to the semiconductor device 11 serving as an observation object) and a Z direction (a vertical direction) orthogonal thereto if necessary.

The control part B includes a camera controller 31, a laser scan (LSM) controller 32, and a peripheral controller 33. The camera controller 31 is electrically connected to the high-sensitive camera 3. The LSM controller 32 is electrically connected to the LSM unit 4. The camera controller 31 and the LSM controller 32 are configured to control the operations of the high-sensitive camera 3 and the LSM unit 4 so that the semiconductor device 11 is observed by the observation part A (in order to acquire an image) or an observation condition is set.

The peripheral controller 33 is electrically connected to the X-Y-Z stage 7 and the LSM unit 4. The peripheral controller 33 is configured to control the operation of the X-Y-Z stage 7 so that the high-sensitive camera 3, the LSM unit 4, and the optical system 20 is moved, position, and focused to a position corresponding to an observation position of the semiconductor device 11. Further, the peripheral controller 33 drives a correction collar adjustment motor 25 attached to the objective lens 21 to adjust the correction collar 24.

The analysis part C includes an image analysis unit 41 and an instruction unit 42 and is configured as a computer including a processor. The analysis part C is electrically connected to the camera controller 31, the LSM controller 32, and the peripheral controller 33. The image analysis unit 41 generates an image based on image information (image data) output from the camera controller 31 and the LSM controller 32 and performs a necessary analysis process by the processor. The instruction unit 42 refers to the analysis content obtained by the image analysis unit 41 or the input content from an operator by the processor and generates a necessary instruction related to an inspection of the semiconductor device 11 in the observation part A through the control part B. Further, image and data which are acquired and analyzed by the analysis part C are displayed on a display device 43 connected to the analysis part C if necessary. The analysis part C constitutes an image generating device.

As illustrated in FIGS. 2 and 3, the solid immersion lens 6 is a microscopic lens having a semispherical shape and is held at a position below (at the front side of) the objective lens 21 by the solid immersion lens holder 8. That is, the solid immersion lens holder 8 holds the solid immersion lens 6 so that the solid immersion lens 6 is disposed on an optical axis L of the objective lens 21. The solid immersion lens 6 includes a spherical face portion (a spherical face) 6a which is disposed to face the objective lens 21 and a contact portion 6d which contacts the semiconductor device 11. The solid immersion lens 6 is disposed on the optical axis L of the objective lens 21 so that the contact portion 6d contacts the semiconductor device 11 (the solid immersion lens is placed on the semiconductor device 11).

A spherical face portion 6a is formed in a semispherical shape and forms an upper portion of the solid immersion lens 6. The spherical face portion 6a includes a spherical upper face 6b which serves as a light input and output face with respect to the objective lens 21 and a circumferential face 6c which is continuous to the edge of the upper face 6b. The contact portion 6d is formed to be recessed toward a side opposite to the upper face 6b side from a bottom face of the spherical face portion 6a and forms a lower portion of the solid immersion lens 6. The contact portion 6d includes an inclined face 6e which is continuous to the circumferential face 6c and a plane contact face 6f which is continuous to the inclined face 6e and extends in a direction perpendicular to the thickness direction of the solid immersion lens 6 (a vertical direction in FIGS. 2 and 3). As illustrated in FIG. 3, an intersection point of a line extended from the inclined face 6e matches a spherical center X of the solid immersion lens 6 (a curvature center of the spherical face portion 6a) in the side view. During the observation of the semiconductor device 11, the contact face 6f contacts an observation position (an upper face in the drawing) of the semiconductor device 11. Additionally, the contact face 6f is not limited to a plane shape.

Specifically, the solid immersion lens 6 is formed of a high refractive index material which is substantially equal or similar to a substrate material of the semiconductor device 11. As a representative example of the high refractive index material, Si, GaP, GaAs, and the like can be exemplified. When the solid immersion lens 6 closely contacts the substrate surface of the semiconductor device 11, the semiconductor device 11 itself is used as a part of the solid immersion lens 6. According to a rear face analysis of the semiconductor device 11 using the solid immersion lens 6, when a focus of the objective lens 21 is aligned to an integrated circuit formed on the substrate surface of the semiconductor device 11, a light flux having a high numerical aperture (NA) can pass though the semiconductor device 11 due to the effect of the solid immersion lens 6 and thus a high resolution can be expected.

A lens shape of the solid immersion lens 6 is determined on the condition that an aberration does not exist. In the semispherical solid immersion lens 6, the spherical center (the curvature center of the spherical face portion 6a) X serves as a focus. In this case, both the numerical aperture (NA) and the magnification are n times. Additionally, a shape of the solid immersion lens 6 is not limited to a semispherical shape. For example, a Weierstrass shape may be used.

The solid immersion lens holder 8 which is a feature of the embodiment appropriately holds such a solid immersion lens 6 at a position below (before) the objective lens 21. The solid immersion lens holder 8 is formed of, for example, metal such as aluminum. As illustrated in FIG. 2, the solid immersion lens holder 8 includes a cylindrical main body 61 which is attached to a lower end of the objective lens 21 and a lens holding portion 65 which is provided at the end on the semiconductor device 11 side (a side opposite to the objective lens 21) of the main body 61 and holds the solid immersion lens 6.

Inside the main body 61, the light output from the LSM unit 4 travels toward the solid immersion lens 6 side and the light reflected by the semiconductor device 11 and output from the solid immersion lens 6 travels toward the objective lens 21 side. The main body 61 includes a cylindrical circumferential wall portion 62 which is inserted into the lower end of the objective lens 21 from the outside to be screwed. When the circumferential wall portion 62 is screwed to the lower end of the objective lens 21, the center of the solid immersion lens holder 8 is positioned onto the optical axis L of the objective lens 21. A position of the solid immersion lens 6 which is held by the solid immersion lens holder 8 is adjusted by the driving of the X-Y-Z stage 7.

The main body 61 includes an extension wall portion 63 which extends between the circumferential wall portion 62 and the lens holding portion 65. The extension wall portion 63 is formed to be located at the outside of the lens holding portion 65 in the radial direction in any position thereof. In this example, the extension wall portion 63 is formed in a shape having a plurality of bent portions. The extension wall portion 63 includes a first wall portion 63a which is continuous to the circumferential wall portion 62 and extends in parallel to the optical axis L of the objective lens 21, a second wall portion 63b which is continuous to the first wall portion 63a and extends toward a center side of the main body 61 while being orthogonal to the first wall portion 63a, and a third wall portion 63c which is continuous to the second wall portion 63b and extends to the lens holding portion 65 while being inclined with respect to the optical axis L.

As illustrated in FIGS. 3 and 4, the lens holding portion 65 includes a first member 70 that is integrated with the main body 61 and a cylindrical second member 80 that is attached to the semiconductor device 11 side of the first member 70.

The first member 70 includes a base portion 70A which has a circular flat plate shape and extends to be orthogonal to the optical axis L of the objective lens 21. A center portion of the base portion 70A is provided with a first opening 71 which has a circular shape and has a center P1 located on the optical axis L of the objective lens 21. An inner diameter of the first opening 71 is larger than an outer diameter of the spherical face portion 6a of the solid immersion lens 6. The outer diameter of the spherical face portion 6a is an outer diameter when viewed from the objective lens 21 and is an outer diameter of the circumferential face 6c in the embodiment.

The first member 70 includes three protrusion portions 73 which extend from an inner face 71a of the first opening 71 toward the center P1 side to be perpendicular to the optical axis L. As illustrated in FIG. 4, three protrusion portions 73 have a following configuration when viewed from the objective lens 21. That is, each of three protrusion portions 73 is formed in a fan shape in which a radial length is longer than a circumferential length and extends so that a center line S passes through the center P1. Further, three protrusion portions 73 are provided at an interval of 120 degrees (at three equal intervals) in the circumferential direction of the first opening 71. A front end face 74 of each of three protrusion portions 73 is formed as a curved face and is located on a circumference R1 having the center P1 as a center. Further, a distance from the front end face 74 of each of three protrusion portions 73 to the center P1 is smaller than the outer diameter of the spherical face portion 6a of the solid immersion lens 6.

A thick portion 75 which partially protrudes toward the semiconductor device 11 side and is formed in a thick thickness is provided from a front end of each of three protrusion portions 73 to an intermediate portion thereof. As illustrated in FIG. 3, a front end 76 of the thick portion 75 is formed in a tapered shape and a face on the semiconductor device 11 side is formed as an inclined face 76a which is inclined toward the objective lens 21 as it goes toward the center P1 of the first opening 71. The inclined face 76a is continuous to the front end face 74. A thickness of the front end 76 of the thick portion 75 is thinner than a thickness of the base portion 70A in the vicinity of the front end face 74. The thick portion 75 is provided with an insertion hole 77 used to fix the second member 80.

As illustrated in FIG. 3, the second member 80 includes a main body 81 which has a cylindrical shape and a bottom face portion 85 which has a circular flat plate shape and is provided at the end on the semiconductor device 11 side of the main body 81. An inner diameter of the main body 81 is slightly larger than the outer diameter of the spherical face portion 6a of the solid immersion lens 6. Further, an end on the objective lens 21 side of the main body 81 is provided with a flange portion 83 which protrudes outward in the radial direction. The flange portion 83 is provided with an insertion hole 84 used to fix the first member 70. The second member 80 is fixed to the first member 70 in such a manner that a bolt 90 is inserted from the semiconductor device 11 into the insertion hole 84 and the insertion hole 77 to be fastened thereto. A center portion of the bottom face portion 85 is provided with a second opening 87 which has a circular shape and in which a center P2 is located on the optical axis L of the objective lens 21. An inner diameter of the second opening 87 is smaller than the outer diameter of the spherical face portion 6a of the solid immersion lens 6.

Here, when the solid immersion lens 6 is held by the lens holding portion 65, the spherical face portion 6a is disposed inside the first opening 71 of the first member 70 so that a part of the spherical face portion 6a (the upper face 6b) protrudes toward the objective lens 21 side and the contact portion 6d is disposed inside the second opening 87 of the second member 80 so that the contact face 61 protrudes toward the semiconductor device 11 side. Accordingly, the solid immersion lens 6 is accommodated into an accommodation space formed between the first member 70 and the second member 80. Then, the bolt 90 is fastened so that the first member 70 and the second member 80 are fixed to each other.

In this state, as described above, because a distance from the front end face 74 of each of three protrusion portions 73 to the center P1 is smaller than the outer diameter of the spherical face portion 6a, a separation of the solid immersion lens 6 toward the objective lens 21 side is regulated by the first member 70. Further, because a radius of the second opening 87 is smaller than a radius of the spherical face portion 6a, a separation of the solid immersion lens 6 toward the semiconductor device 11 side is also regulated by the second member 80.

The accommodation space which is formed by three protrusion portions 73, the main body 81, and the bottom face portion 85 is slightly larger than the spherical face portion 6a of the solid immersion lens 6. Thus, the lens holding portion 65 has a gutter, in other words, a clearance (a gap) with respect to the solid immersion lens 6, As illustrated in FIG. 5(a), the lens holding portion 65 holds the solid immersion lens 6 so that the solid immersion lens is swingable in a direction indicated by an arrow Y in a state before the solid immersion lens 6 contacts the semiconductor device 11. At this time, the solid immersion lens 6 is supported by the second member 80 (the bottom face portion 85).

When the contact face 6f is brought into contact with the semiconductor device 11 from this state, the solid immersion lens 6 moves away from the second member 80 so that the spherical face portion 6a contacts three protrusion portions 73 as illustrated in FIG. 5(b). At this time, because the above-described clearance is provided, the solid immersion lens 6 swings or rotates so that the contact face 6f closely contacts the surface of the semiconductor device 11 so as to follow it and thus the solid immersion lens 6 and the semiconductor device 11 can satisfactorily contact each other. For example, even when the semiconductor device 11 is inclined with respect to the optical axis L, the semiconductor device 11 can be observed.

In the embodiment, because the solid immersion lens 6 and the lens holding portion 65 contact each other only at a contact position between each of three protrusion portions 73 and the spherical face portion 6a, a contact area is small. For that reason, a frictional force which is generated when the solid immersion lens 6 swings is small. As a result, because the solid immersion lens 6 and the lens holding portion 65 can easily slide on each other, the solid immersion lens 6 can easily follow and closely contact the semiconductor device 11. Additionally, because an observation position of the solid immersion lens 6 matches the spherical center X even when the solid immersion lens 6 swings in this way, an observation is not influenced.

A state where the solid immersion lens 6 contacts the semiconductor device 11 will be described by referring to FIGS. 2 and 3. In this state, the contact face 6f is pressed toward the objective lens 21 side so that three protrusion portions 73 contact the spherical face portion 6a (the upper face 6b) of the solid immersion lens 6. Specifically, three protrusion portions 73 comes into line-contact with the spherical face portion 6a in the circumferential direction by an edge 74a of the front end face 74 near the semiconductor device 11. As described above, because the front end faces 74 of three protrusion portions 73 are located on the circumference R1 having the center P1 as a center (FIG. 4), the contact position between each of three protrusion portions 73 and the spherical face portion 6a is also located on the circumference R1. Further, in the embodiment, an angle θ1 formed between a line Z1 passing through the contact position and the curvature center X of the spherical face portion 6a and the optical axis L of the objective lens 21 is 45 degrees.

Next, an example of a method of acquiring an image of the semiconductor device 11 by using the semiconductor inspection device 1 will be described.

First, an observation position of the semiconductor device 11 using the solid immersion lens 6 is specified by the objective lens 21 without the solid immersion lens 6 among the plurality of objective lenses 21 that belongs to the microscope 5. The observation position is specified in such a manner that the instruction unit 42 drives the X-Y-Z stage 7 through the peripheral controller 33.

After the observation position is specified, the observation is performed by the objective lens 21 with the solid immersion lens holder 8. At this time, the instruction unit 42 adjusts the correction collar 24 to an appropriate position by driving the correction collar adjustment motor 25 through the peripheral controller 33 in response to the characteristics of the solid immersion lens 6 (the thickness or the refractive index of the solid immersion lens 6) held by the solid immersion lens holder 8 and the substrate thickness or the substrate material of the semiconductor device 11.

The instruction unit 42 drives the X-Y-Z stage 7 through the peripheral controller 33 in response to the characteristics of the solid immersion lens 6 so that the solid immersion lens 6 is pressed against the semiconductor device 11. At this time, as described above, because the solid immersion lens 6 swings inside the lens holding portion 65 so that the contact face 6f follows and closely contacts the surface of the semiconductor device 11, the solid immersion lens 6 and the semiconductor device 11 can satisfactorily and closely contact each other.

The instruction unit 42 drives the X-Y-Z stage 7 through the peripheral controller 33 to focus the objective lens 21. Then, the instruction unit 42 observes the semiconductor device 11 by using the LSM unit 4 and the high-sensitive camera 3 through the LSM controller 32 and the camera controller 31 while the objective lens 21 is focused.

In this observation, the infrared laser light which is output from the LSM unit 4 is output toward the sample 10 through the objective lens 21. The light which is output from the objective lens 21 passes through the main body 61 so that the light is incident to the solid immersion lens 6 from the upper face 6b of the solid immersion lens 6 and is output toward the semiconductor device 11. Then, the light (the reflected light) which is emitted as the infrared laser light and is reflected from the semiconductor device 11 is incident to the solid immersion lens 6 again and is output from the upper face 6b of the solid immersion lens 6. More specifically, the light reflected from the semiconductor device 11 is output from an inner portion in relation to the first opening 71 in the upper face 6b.

The reflected light which is output from the solid immersion lens 6 passes through the main body 61 and is incident to the objective lens 21. The reflected light which is incident to the objective lens 21 is guided toward the high-sensitive camera 3 by the camera optical system 22. The high-sensitive camera 3 acquires an image of the circuit pattern of the semiconductor device 11.

The operations and the effects of the solid immersion lens holder 8 and the semiconductor inspection device 1 including the solid immersion lens holder 8 will be described.

According to the solid immersion lens holder 8, because three protrusion portions 73 contact the spherical face portion 6a of the solid immersion lens 6, a contact area with respect to the solid immersion lens 6 can be decreased. Accordingly, because a frictional force which acts on the solid immersion lens 6 when the solid immersion lens 6 swings decreases, the solid immersion lens 6 and the solid immersion lens holder 8 can easily slide on each other and thus the solid immersion lens 6 can easily follow and closely contact the semiconductor device 11. As a result, it is possible to obtain a sharp image of the semiconductor device 11 in the semiconductor inspection device 1 including the solid immersion lens holder 8.

In the solid immersion lens holder 8, because three protrusion portions 73 are provided at an interval of 120 degrees in the circumferential direction of the first opening 71, an average force can be applied to the spherical face portion 6a when the protrusion portion 73 contacts the spherical face portion 6a. Accordingly, the solid immersion lens 6 can easily follow and closely contact the semiconductor device 11. Further, in the embodiment, a constant force can be applied to the spherical face portion 6a.

In the solid immersion lens holder 8, the line Z1 passing through a contact position between each of three protrusion portions 73 and the spherical face portion 6a and the curvature center X of the spherical face portion 6a intersects the optical axis L of the objective lens 21 at 45 degrees. In a case where the angle θ1 formed between the line Z1 and the optical axis L is large and three protrusion portions 73 are short, this case is desirable in that vignetting of light decreases. However, this case is not desirable in that the solid immersion lens 6 and the solid immersion lens holder 8 hardly slide on each other. Meanwhile, in a case where the angle θ1 is small and three protrusion portions 73 are long, this case is desirable in that the solid immersion lens 6 and the solid immersion lens holder 8 easily slide on each other. However, this case is not desirable in that that vignetting of light increases. Regarding this point, if the angle θ1 is 45 degrees as in the solid immersion lens holder 8, it is possible to ensure a satisfactory slide between the solid immersion lens 6 and the solid immersion lens holder 8 while keeping a viewing field of the objective lens 21.

In the solid immersion lens holder 8, three protrusion portions 73 come into line-contact with the spherical face portion 6a. Accordingly, because it is possible to further decrease a contact area of the protrusion portion with respect to the solid immersion lens 6, the solid immersion lens 6 and the solid immersion lens holder 8 can further easily slide on each other.

In the solid immersion lens holder 8, a contact position between each of three protrusion portions 73 and the spherical face portion 6a is located on the circumference R1 having the center P1 of the first opening 71 as a center. Accordingly, when the protrusion portion 73 contacts the spherical face portion 6a, an average force can be applied to the spherical face portion 6a. For that reason, the solid immersion lens 6 can easily follow and closely contact the semiconductor device 11. Further, in the embodiment, a constant force can be applied to the spherical face portion 6a.

Modified Example

Figure 6:
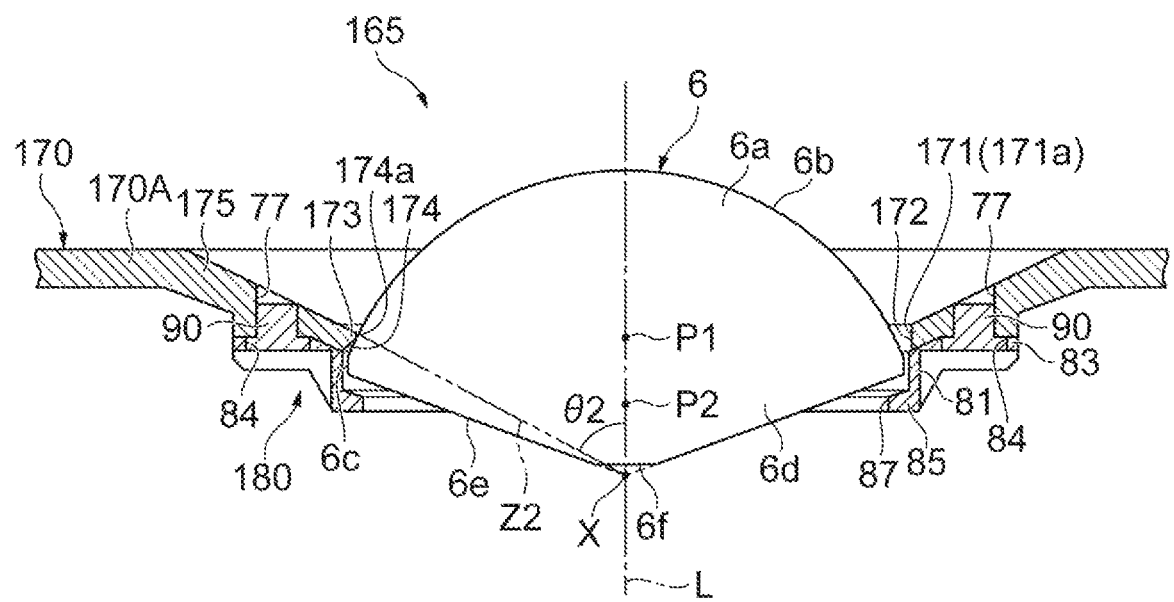
FIG. 6 is a diagram illustrating a modified example, where FIG. 6(*a*) is a configuration diagram illustrating a lens holding portion and FIG. 6(*b*) is a diagram illustrating a first member when viewed from an objective lens.
Figure 6:
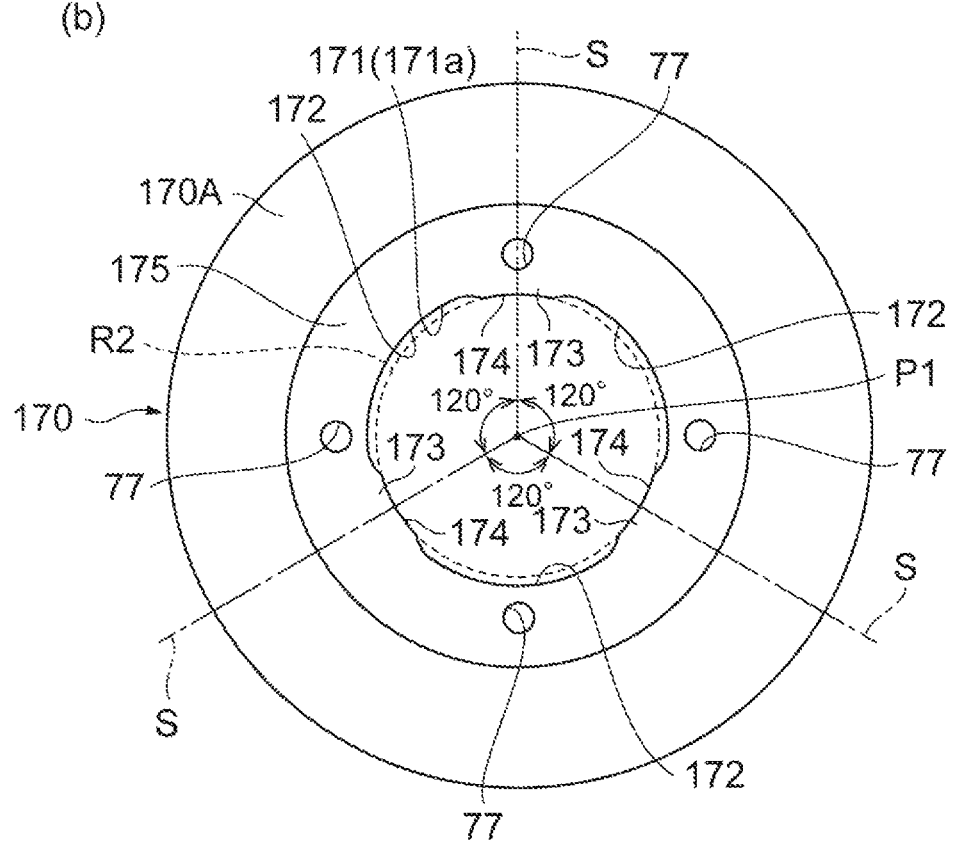

FIG. 6 is a diagram illustrating a modified example, where FIG. 6(a) is a configuration diagram of a lens holding portion and FIG. 6(b) is a diagram illustrating a first member when viewed from an objective lens. A lens holding portion 165 of the modified example is different from the lens holding portion 65 of the above-described embodiment in the configuration of three protrusion portions 173 contacting the spherical face portion 6a of the solid immersion lens 6. FIGS. 6(a) and 6(b) are different from each other in scale and FIG. 6(a) is enlarged.

As illustrated in FIG. 6(a), the lens holding portion 165 includes a first member 170 and a second portion 180. The first member 170 includes a base portion 170A which has a circular flat plate shape and extends to be orthogonal to the optical axis L of the objective lens 21 and an inclined portion 175 which is continuous to the base portion 170A. The inclined portion 175 extends to be inclined toward the semiconductor device 11 side as it goes from the base portion 170A toward the optical axis L. As illustrated in FIG. 6(b), four insertion holes 77 are provided at an interval of 90 degrees (four equal intervals) in the circumferential direction of the inclined portion 175.

A first opening 171 which has a circular shape and in which the center P1 is located on the optical axis L of the objective lens 21 is formed at a center portion of the inclined portion 175. The first opening 171 is formed in such a manner that a penetration hole is formed at a center portion of the inclined portion 175 and three concave portions 172 are formed along an edge of the penetration hole at the same interval. For example, the concave portion 172 is formed by cutting a predetermined portion of the edge of the penetration hole. Because the concave portions 172 are provided, a protrusion portion 173 is formed between the adjacent concave portions 172. Accordingly, an inner face 171a of the first opening 171 is provided with three protrusion portions 173 which extend toward the center P1 side while being inclined with respect to the optical axis L.

As illustrated in FIG. 6(b), three protrusion portions 173 have a following configuration when viewed from the objective lens 21. That is, each of three protrusion portions 173 is formed in a fan shape in which a circumferential length is longer than a radial length and extends so that a center line S passes through the center P1. Further, three protrusion portions 173 are provided at an interval of 120 degrees (at three equal intervals) in the circumferential direction of the first opening 171. A front end face 174 of each of three protrusion portions 173 is formed as a curved face and is located on a circumference R2 having the center P1 as a center. The circumference R2 matches the circumference of the penetration hole.

In a state where the solid immersion lens 6 contacts the observation object, three protrusion portions 173 come into line-contact with the spherical face portion 6a in the circumferential direction by an edge 174a of the front end face 174 near the objective lens 21. A contact position is located the observation object side in relation to the extension direction of the base portion 170A. As described above, because the front end face 174 of each of three protrusion portions 173 is located on the circumference R2 having the center P1 as a center, a contact position between each of three protrusion portions 173 and the spherical face portion 6a is also located on the circumference R2. Further, in this example, an angle θ2 formed between a line Z2 passing through the contact position and the curvature center X of the spherical face portion 6a and the optical axis L of the objective lens 21 is 63 degrees.

Even in the solid immersion lens holder of the modified example, because three protrusion portions 173 contact the spherical face portion 6a of the solid immersion lens 6 similarly to the solid immersion lens holder 8 of the above-described embodiment, a contact area with respect to the solid immersion lens 6 can be decreased. As a result, the solid immersion lens 6 can easily follow and closely contact the observation object.

Further, according to the solid immersion lens holder of the modified example, the protrusion portion 173 can be formed in such a manner that the penetration hole is formed in the first member 170 in accordance with the shape of the spherical face portion 6a and the concave portion 172 is formed in the penetration hole. For this reason, the solid immersion lens holder can be easily manufactured. Additionally, because the solid immersion lens holder is formed of, for example, aluminum, the solid immersion lens holder can be relatively and easily cut.

While the embodiment according to an aspect of the present invention has been described, the present invention is not limited to the above-described embodiment.

In the above-described embodiment, an example has been described in which the angles θ1 and θ2 respectively formed between the lines Z1 and Z2 and the optical axis L are 45 degrees or 63 degrees, the angles may be in the range of 30 to 65 degrees. In this range, it is possible to ensure a satisfactory slide between the solid immersion lens 6 and the solid immersion lens holder 8 while keeping a viewing field of the objective lens 21.

In the above-described embodiment, a configuration has been described in which the lens holding portion 65 including the first member 70 and the second member 80 is attached to the objective lens 21 through the main body 61, but the lens holding portion 65 may be provided. For example, the lens holding portion 65 may be provided in a casing of the objective lens 21 in consideration of a configuration. Further, the solid immersion lens holder 8 may be an arm type (a movable type) solid immersion lens holder in which the solid immersion lens 6 can be disposed on the optical axis L of the objective lens 21.

In the above-described embodiment, an example of a vertical illumination type has been described in which the contact face 6f of the solid immersion lens 6 comes into contact with the semiconductor device 11 serving as the observation object from above, but the invention may be also applied to an inverted inspection device in which the contact face 6f comes into contact with the observation object from below. In the case of the inverted inspection device, the observation object is observed from below. In the case of the inverted inspection device, three protrusion portions 73 contact the spherical face portion 6a by gravity even in a state before the solid immersion lens 6 comes into contact with the observation object. Even in this case, because the solid immersion lens 6 swings while sliding on three protrusion portions 73 when the solid immersion lens comes into contact with the observation object, the solid immersion lens 6 can closely contact the observation object in a following manner.

In the above-described embodiment, an example has been described in which the angle θ1 and θ2 respectively formed between the lines Z1 and Z2 and the optical axis L are 45 degrees or 63 degrees, but the angles respectively formed between the lines Z1 and Z2 and the optical axis L may be equal to or larger than 15 degrees and equal to or smaller than 65 degrees. In this range, it is possible to ensure a satisfactory slide between the solid immersion lens 6 and the solid immersion lens holder 8 while keeping a viewing field of the objective lens 21. Further, the angles respectively formed between the lines Z1 and Z2 and the optical axis L may be equal to or larger than 15 degrees and equal to or smaller than 30 degrees. As a contact position between the protrusion portion 73 and the spherical face portion 6a is closer to the optical axis, a slide easily occurs between the spherical face portion 6a of the solid immersion lens 6 and the protrusion portion 73 of the solid immersion lens holder 8 and the solid immersion lens 6 easily follows the semiconductor device 11.

REFERENCE SIGNS LIST

1: semiconductor inspection device (image acquisition device), 2: stage, 4a: optical detector, 6: solid immersion lens, 6a: spherical face portion, 6b: upper face, 6d: contact portion, 6f: contact face, 8: solid immersion lens holder, 10: sample, 11: semiconductor device (observation object), 21: objective lens, 61: main body, 62: circumferential wall portion, 63: extension wall portion, 65: lens holding portion, 70: first member, 70A: base portion, 71: first opening, 71a: inner face of first opening, 73: protrusion portion, 74: front end face, 74a: edge, 75: thick portion, 76: front end, 76a: inclined face, 77: insertion hole, 80: second member, 81: main body, 83: flange portion, 84: insertion hole, 85: bottom face portion, 87: second opening, 90: bolt, L: optical axis, P1: center of first opening, P2: center of second opening, X: curvature center (spherical center)

The invention claimed is:

1. A solid immersion lens holder holding a solid immersion lens at a front side of an objective lens, the solid immersion lens including a spherical face portion disposed to face the objective lens and a contact portion having a contact face configured to contact an observation object, and the solid immersion lens holder comprising:
    a first member having a first opening disposing the spherical face portion therein so that a part of the spherical face portion protrudes toward an objective lens side, and three protrusion portions extending from an inner face of the first opening toward a center of the first opening and in contact with the spherical face portion when the solid immersion lens comes into contact with the observation object during imaging; and
    a second member having a second opening disposing the contact portion therein so that the contact face protrudes toward a side opposite to the objective lens side,
    wherein an edge on the side opposite to the objective lens side of a front end face of each of the three protrusion portions is located on a circumference having the center of the first opening as a center,
    wherein the three protrusion portions come into a single line-contact with the spherical face portion at the respective edges of the front end faces such that a contact position between each of the three protrusion portions and the spherical face portion is located on the circumference having the center of the first opening as a center when the solid immersion lens comes into contact with the observation object during imaging, and
    wherein the solid immersion lens swings while sliding on the three protrusion portions, when the solid immersion lens comes into contact with the observation object to image the observation object.

2. The solid immersion lens holder according to claim 1, wherein the three protrusion portions are provided at an interval of 120 degrees in a circumferential direction of the first opening.

3. The solid immersion lens holder according to claim 1, wherein a line passing through the contact position between each of the three protrusion portions and the spherical face portion and a curvature center of the spherical face portion intersects an optical axis of the objective lens in the range of 15 to 65 degrees.

4. An image acquisition device comprising:
    a stage holding an observation object;
    an objective lens disposed to face the observation object on the stage;
    the solid immersion lens holder according to claim 1 holding the solid immersion lens at the front side of the objective lens;
    an optical detector configured to detect light from the observation object through the solid immersion lens and the objective lens and to output image data; and
    an image generating device configured to generate an image of the observation object based on the image data.

5. The solid immersion lens holder according to claim 2, wherein a line passing through the contact position between each of the three protrusion portions and the spherical face portion and a curvature center of the spherical face portion intersects an optical axis of the objective lens in the range of 15 to 65 degrees.

6. A solid immersion lens holder holding a solid immersion lens at a front side of an objective lens, the solid immersion lens including a spherical face portion disposed to face the objective lens and a contact portion having a contact face configured to contact an observation object, and the solid immersion lens holder comprising:

a first member having a first opening disposing the spherical face portion therein so that a part of the spherical face portion protrudes toward an objective lens side, and three protrusion portions extending from an inner face of the first opening toward a center of the first opening and in contact with the spherical face portion when the solid immersion lens comes into contact with the observation object during imaging, wherein an edge on the side opposite to the objective lens side of a front end face of each of the three protrusion portions is located on a circumference having the center of the first opening as a center, and wherein the three protrusion portions come into a single line-contact with the spherical face portion at respective edges of front end faces; and a second member having a second opening disposing the contact portion therein so that the contact face protrudes toward a side opposite to the objective lens side, wherein the solid immersion lens swings while sliding on the three protrusion portions, when the solid immersion lens comes into contact with the observation object to image the observation object.

\* \* \* \* \*